United States Patent
Vennelakanti et al.

(10) Patent No.: US 9,619,018 B2
(45) Date of Patent: Apr. 11, 2017

(54) MULTIMODAL INTERACTIONS BASED ON BODY POSTURES

(75) Inventors: Ramadevi Vennelakanti, Bangalore (IN); Anbumani Subramanian, Bangalore (IN); Prasenjit Dey, Bangalore (IN); Sriganesh Madhvanath, Bangalore (IN); Dinesh Mandalapu, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 102 days.

(21) Appl. No.: 14/119,865

(22) PCT Filed: May 23, 2011

(86) PCT No.: PCT/IN2011/000356
§ 371 (c)(1),
(2), (4) Date: Nov. 23, 2013

(87) PCT Pub. No.: WO2012/160566
PCT Pub. Date: Nov. 29, 2012

(65) Prior Publication Data
US 2014/0132505 A1    May 15, 2014

(51) Int. Cl.
G06F 3/01    (2006.01)

(52) U.S. Cl.
CPC .............. *G06F 3/011* (2013.01); *G06F 3/017* (2013.01)

(58) Field of Classification Search
CPC .......... G06F 3/017; G06F 3/011; H04N 7/147
USPC ................ 715/863; 345/158, 156; 348/14.16
See application file for complete search history.

(56) References Cited

U.S. PATENT DOCUMENTS

| | | | |
|---|---|---|---|
| 7,028,269 B1 * | 4/2006 | Cohen-Solal | H04N 5/23203 348/E5.043 |
| 7,584,280 B2 | 9/2009 | Kim et al. | |
| 2002/0178344 A1 | 11/2002 | Bourguet et al. | |
| 2003/0156756 A1 | 8/2003 | Gokturk et al. | |
| 2008/0297589 A1 * | 12/2008 | Kurtz | H04N 7/147 348/14.16 |

(Continued)

FOREIGN PATENT DOCUMENTS

| | | |
|---|---|---|
| CN | 101131609 A | 2/2008 |
| WO | 2011045789 A1 | 4/2011 |

OTHER PUBLICATIONS

O. Rashid et al., "Integration of gesture and posture recognition systems for interpreting dynamic meanings using particle filter," Soft Computing and Pattern Recognition, 2010 Int'l Conf of, Dec. 7-10, 2010, pp. 47-50, ISBN 978-1-4244-7897-2.

(Continued)

*Primary Examiner* — Carolyn R Edwards
*Assistant Examiner* — James Nokham
(74) *Attorney, Agent, or Firm* — HP Inc. Patent Department

(57) ABSTRACT

In one example, a method for multimodal human-machine interaction includes sensing a body posture of a participant using a camera (605) and evaluating the body posture to determine a posture-based probability of communication modalities from the participant (610). The method further includes detecting control input through a communication modality from the participant to the multimedia device (615) and weighting the control input by the posture-based probability (620).

18 Claims, 7 Drawing Sheets

(56) References Cited

U.S. PATENT DOCUMENTS

| | | | |
|---|---|---|---|
| 2010/0303289 A1* | 12/2010 | Polzin et al. | 382/103 |
| 2010/0306710 A1 | 12/2010 | Poot | |
| 2010/0325590 A1* | 12/2010 | Homma et al. | 715/863 |
| 2011/0157009 A1* | 6/2011 | Kim | G06F 3/017 345/156 |
| 2011/0175810 A1* | 7/2011 | Markovic | G06F 3/017 345/158 |
| 2011/0301934 A1* | 12/2011 | Tardif | 704/1 |

OTHER PUBLICATIONS

International Search Report and Written Opinion in parent PCT patent application PCT/IN2011/000356, dated Mar. 1, 2012.
Castellano, Ginevra, et al. "Multimodal emotion recognition from expressive faces, body gestures and speech." Artificial intelligence and innovations 2007: From theory to applications. Springer US, 2007. 375-388.
Epps, Julien et al. "Integration of speech and gesture inputs during multimodal interaction." Proc Aust. Int. Conf. on CHI. 2004.
Gunes, Hatice et al. "Bi-modal emotion recognition from expressive face and body gestures." Journal of Network and Computer Applications 30.4 (2007): 1334-1345.
Gunes, Hatice et al. "Face and body gesture recognition for a vision-based multimodal analyzer." Proceedings of the Pan-Sydney area workshop on Visual information processing. Australian Computer Society, Inc., 2004.

* cited by examiner

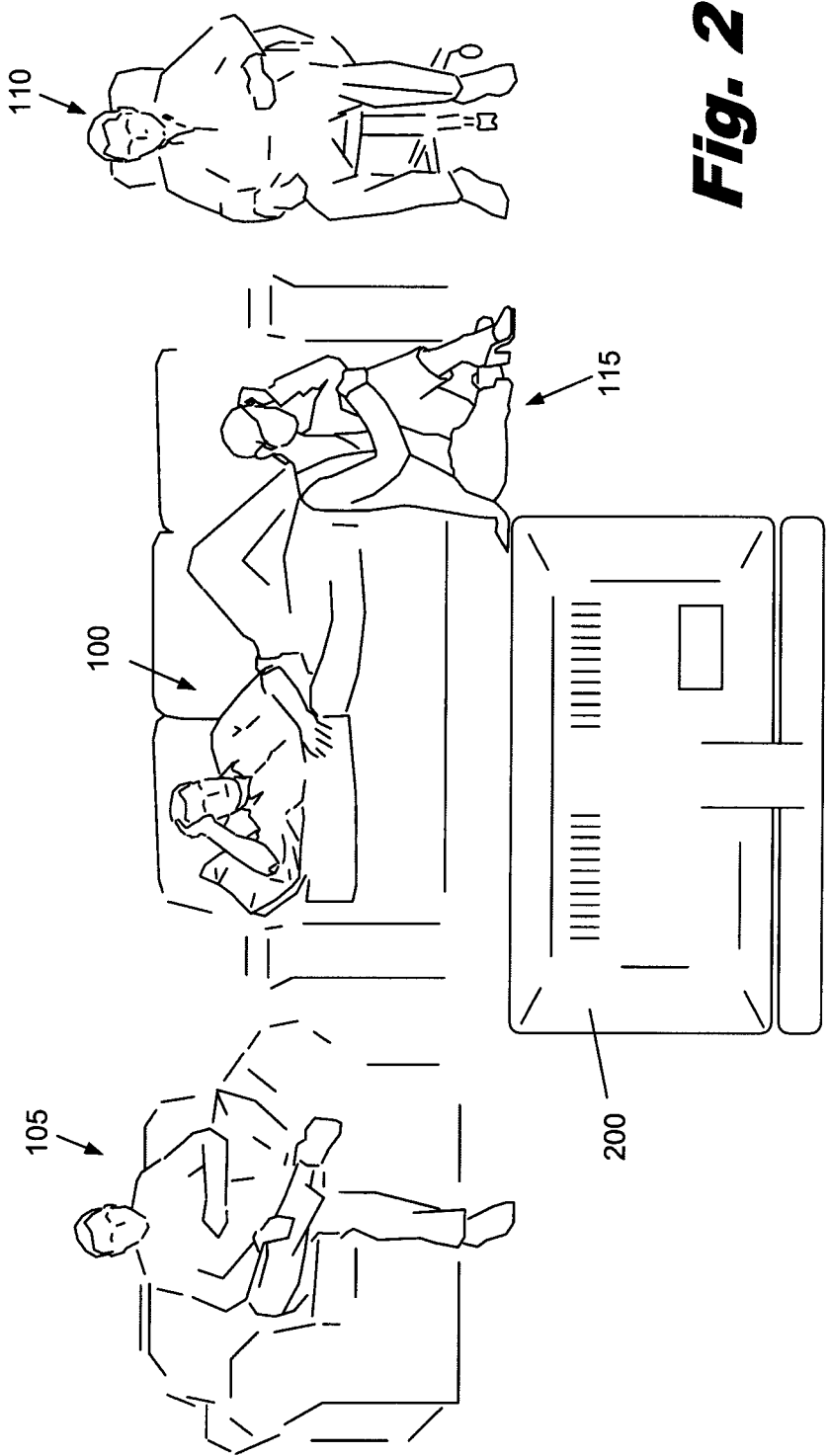

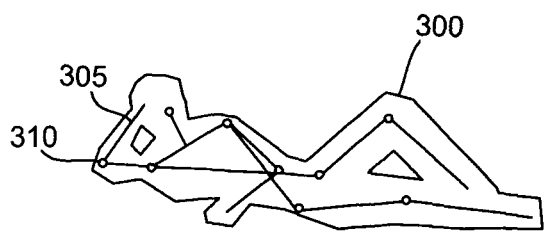
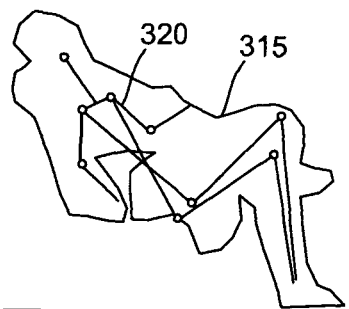
Fig. 3A  Fig. 3B
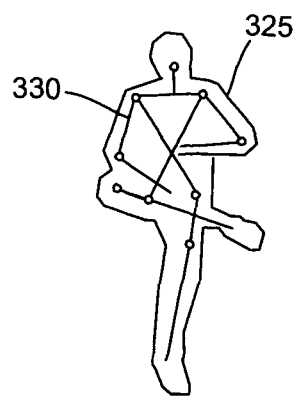
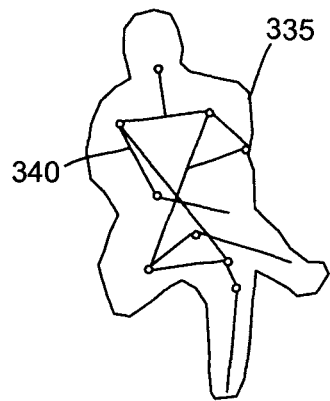
Fig. 3C  Fig. 3D
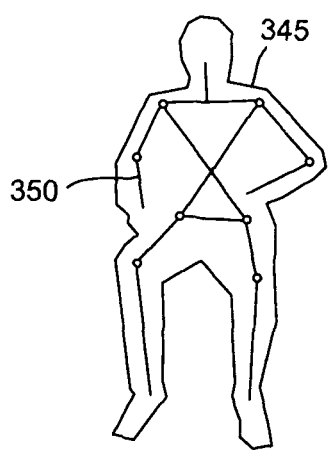
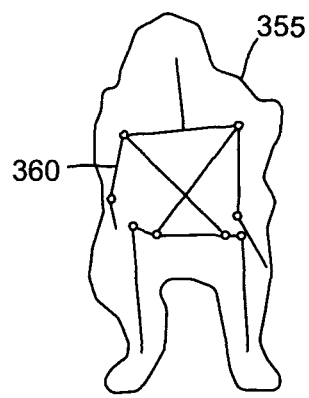
Fig. 3E  Fig. 3F

MULTIMODAL INTERACTIONS BASED ON BODY POSTURES

BACKGROUND

Human-to-human communication occurs through a variety of modes. These communication modes include speech, gestures, touch, body language, posture, facial expression and eye contact. Body posture can be used to determine a participant's degree of attention or involvement, the difference in status between communicators, and the level of fondness a person has for the other communicator. Posture is understood through indicators such as direction of lean, body orientation, arm and hand positions, and body openness.

Media devices interacting with humans typically accept input from very few of the communication modalities that are present. The inability of media devices to utilize posture based communication can lead to stiff, artificial communication and a lack of comprehension in human-machine interactions.

BRIEF DESCRIPTION OF THE DRAWINGS

The accompanying drawings illustrate various examples of the principles described herein and are a part of the specification. The illustrated examples are merely examples and do not limit the scope of the claims.

FIG. 2 is an illustration of a group participating in a co-present multi-user multimodal human-machine interaction, according to one example of principles described herein.

FIGS. 3A-3F are diagrams of illustrative skeletons for determining body posture, according to one example of principles described herein.

Throughout the drawings, identical reference numbers designate similar, but not necessarily identical, elements.

DETAILED DESCRIPTION

Body posture of multimedia participants communicate a range of information about the participants' level of engagement with the media and the way in which they will communicate with multimedia devices. For example, a participant's posture can indicate the participant's degree of attention, involvement, and frequency of interaction with the media being presented. The postures also impact the modes of interaction adopted by these participants.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

Machine-based utilization of human communication modalities is dependent on awareness and recognition of these modalities. When recognized, these modalities can provide prioritization and context for interrelated communications. Where body posture is recognized as an input to provide prioritization in these interactions, the media system can better anticipate the probable interaction modality of an individual participant or each participant in a group. Inputs to the system may be in the form of speech, touch, visual hand gestures, gaze, face detection and recognition, etc. Each of these inputs, whether multimodal or unimodal, whether implicit or explicit, are impacted in their performance by the body posture of the participant. For example, a person who is lounging on a couch may only be able to use a single hand for interactions. A person who is holding something in their hands may only be able to use speech for interactions. If the interaction required by the media device requires the participant to exit a particular posture and stand or sit upright in front of the device, the participant experience is less satisfactory and will lead to the abandoning of the gestural interaction with the system for the more conventional interactions such as a keyboard and a mouse.

In one implementation, a media system utilizes posture information to better adapt the interaction with the participant. For example, the media system may categorize the seated postures of the participants into three groups: lounge, comfort, and attentive.

Figure 1A:
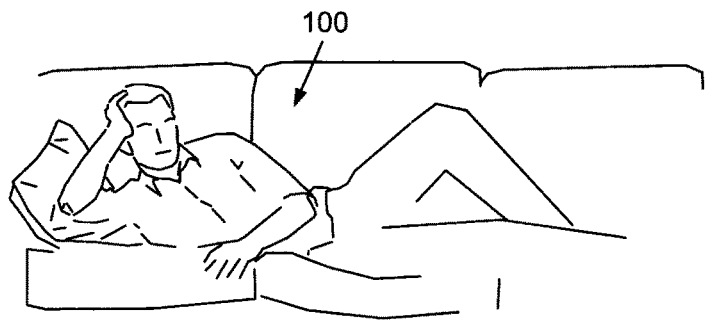
FIGS. 1A-1C are illustrations of various postures of participants in a multimedia interaction, according to one example of principles described herein.

FIG. 1A shows a media participant 100 in a lounge posture. In a typical lounge posture, the participant has a relaxed posture with the torso and the legs stretched out almost parallel to the floor. The participant 100 may be reclining on a flood, bed or couch. The hands may be used to prop the upper body off the ground or position the head to comfortably view the media. This posture locks the movement of the hands. The head movement is restricted with the torso being propped up. Therefore the use of head movement and hands to gesture can be restricted in the lounge posture. The participant 100 is unlikely to stand to interact with media or others. There is greater dependence on speech as an input and interaction modality.

Figure 1B:
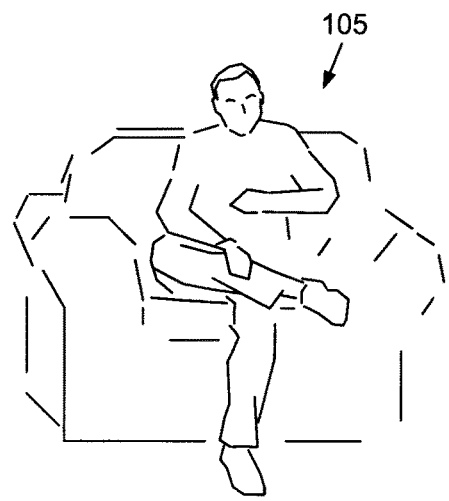

FIG. 1B shows a second media participant 105 in a comfort posture. This is a relaxed but upright posture adopted by participants' while seated in a sofa or on a couch with a slightly inclined back rest. The torso is upright and inclined slightly back and there is no restriction of body movement or use of hands. All modalities—hand gestures, speech, head and face—are available for interaction. In some examples, the participant 105 may rest their elbows on the armrest, thus restricting hand movement and increasing dependence on speech communication.

Figure 1C:
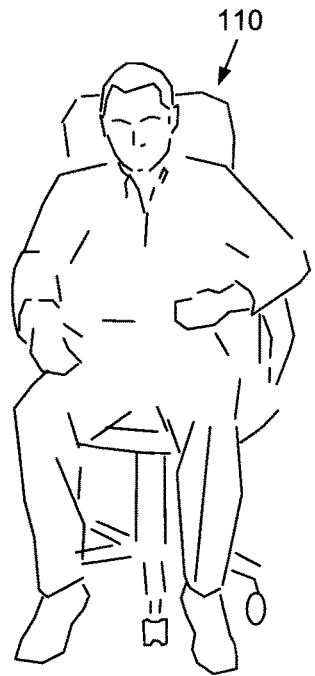

FIG. 1C shows a third media participant 110 in an attentive posture. The attentive posture is similar to the comfort posture but more alert. In the attentive posture, participants 110 tend to lean forward and focus on the interaction with the media device. However, the attentive participants 110 may rest elbow on the knee and thus restrict the availability of the hand for interaction and increasing the dependence on speech. However, the attentive posture indicates that the media participant 110 may be more active in communicating with the multimedia device and may shift posture to expand a range of communication or to use a different modality.

FIG. 2 is an illustration of a group participating in a co-present multi-user multimodal media presentation. The group includes a first participant 100 in a lounge posture, a second participant 105 in a comfort posture, a third participant 110 in an attentive posture, and a fourth participant 115 in a seated posture that restricts motion of both her hands and feet. The multimedia device 200 presents the media and senses control input from the participants. The control input may include any commands that are used to control or interact with the media or multimedia device 200. For example, the control input may include a wide variety of commands such as power on, power off, play, stop, zoom, and other commands. The multimedia device 200 also accepts application specific commands. For example, a picture application may have any number of commands related to viewing, manipulating and organizing pictures. Video games, movies, internet browsers, video conferencing, word processing, and other applications may all have application specific commands that are sensed and interpreted by the multimedia device 200. The multimedia device 200 may accept control input through a wide range of communication modalities such as verbal and gestural input.

As discussed above, an analysis of the posture of the participants 100, 105, 110, 115 may assist the multimedia device in accurately interpreting the control input. For example, the current posture of the fourth participant 115 precludes the use of hand gestures to communicate with the multimedia device 200. Consequently, the multimedia device 200 can remove all the gestural commands from a command list when analyzing command inputs from the fourth participant 115. When the fourth participant 115 shifts position, the multimedia device 200 can reanalyze her posture to determine if there is an increased likelihood of receiving gestural commands.

The analysis of posture may also include head position and gaze direction. Head position and gaze direction can be used to indicate where the participant's attention is focused. If the first participant's 100 head direction and gaze are toward the second participant 105, it can be accurately assumed that the first participant 100 is directing the communication to the second participant 105 rather than the multimedia device 200. For example, the fourth participant's 115 head is directed at an angle that is to the left of the media device 200. Consequently, the fourth participant 115 may be less engaged with the multimedia device 200 than the other participants 100, 105. 110 and is less likely to issue commands to the multimedia device 200.

The communication modalities of participants can also vary according to a variety of other parameters. For example, the type of application that is presenting the interactive media experience may influence the types of modalities the participants use. The participants may interact using different modalities with a movie application presenting a full length film than with a picture viewing/editing application. When viewing a full length film, the participants may assume lounging postures and minimize interactions. When viewing/editing pictures there may be a higher level of mutual interaction between the participants and between the participants and the media device.

The modalities available for interaction are thus partially based on the posture the participant is in. According to one implementation, the system includes a multimodal combiner that accepts modality inputs from a number of sources, including a posture analyzer. The posture analyzer is able to detect the posture of the participant based on the images from a depth camera, color camera, or other appropriate sensor system. The multimodal combiner can use this information to evaluate and refine the confidence of the input modality for each participant. This early information on expected interaction modality can be used for more intelligent multimodal fusion and result in better recognition.

In one implementation, a skeletal approach is used to estimate the posture of the participants. FIGS. 3A-3F are illustrations of skeletons that can be derived from computer vision data. The posture of the first participant (100, FIG. 2) is represented as an outline 300 and a skeleton that is made up of rigid segments 305 and joints 310. By analyzing the relative position of the rigid segments 305 and the joints 310, the multimedia device can determine the posture of the participant from the computer generated skeleton. In FIG. 3A, the posture can be correctly categorized as a lounging posture in which hand gestures are less likely and voice commands or accessory usage are more likely.

FIG. 3B shows an outline 315 and a skeleton 320 that correspond to a participant in a semi-reclining comfort posture. As discussed above, participants in the comfort posture generally have freedom to gesture with their hands to communicate with the multimedia device. FIGS. 3C and 3D show outlines 325, 335 and skeletons 330, 340 that represent additional participants in comfort postures.

FIGS. 3E and 3F show outlines 345, 355 and skeletons 350, 360 that represent participants in attentive postures. In the attentive posture, the participant may rest his hands or elbows on an arm of a chair or on his knees. In the outlines 345, 355 this is reflected by the lack of visible outlines of the hands. The constriction of hand motion can increase dependence of the attentive participants on the verbal communication and decrease their use of gestural commands.

One illustrative process for using skeletal models to adapt multimodal communication between participants and a multimedia device includes gathering the participants in front of the multimedia system. The multimedia system detects and registers the presence of the participants. Avatars or icons are displayed by the multimedia system. Registered participants are recognized and names are attached to their avatars. For example, the participants may be recognized using voice recognition, facial recognition, or other techniques. Unregistered participants are tagged as guests.

The output of a color camera and a depth camera are used to register the posture of the participants and create a skeleton. For example, when a participant walks into the room, he/she could extend both arms in front of the camera to enable the posture recognition system to initialize a skeletal model of the participant. After the skeletal model of the participant is initialized/known, the participant's hands, legs, torso, and head can be tracked in subsequent frames delivered by the cameras. If both the hands and forearm are visible and the participant has an upright torso, then it can be assumed that the participant is in a posture where hand gestures can be used as a mode of interaction.

If the skeletal model indicates that the torso is not upright and the elbows appear attached or closer to the body, the participant is probably in a comfort posture where coarse, arm-level gestures are less likely, but fine hand level gestures are still possible. If no hands are visible in the skeletal model, then the participant is probably curled up and it can be assumed that no hand gesture interaction is possible. As the participants change posture, the system tracks these changes.

As one or more of the participants interacts with the system, the system uses posture information along with the interaction input to shortlist the possible commands received from the participants. Based on the identified posture, a particular communication modality is weighted higher in the results to reflect the preference of this modality by a participant in that posture. If a particular kind of gesture or utterance is not possible due to a posture, the associated commands can be temporarily pruned from the recognition vocabulary. This provides additional accuracy in identifying commands and better multimodal fusion.

Figure 4:
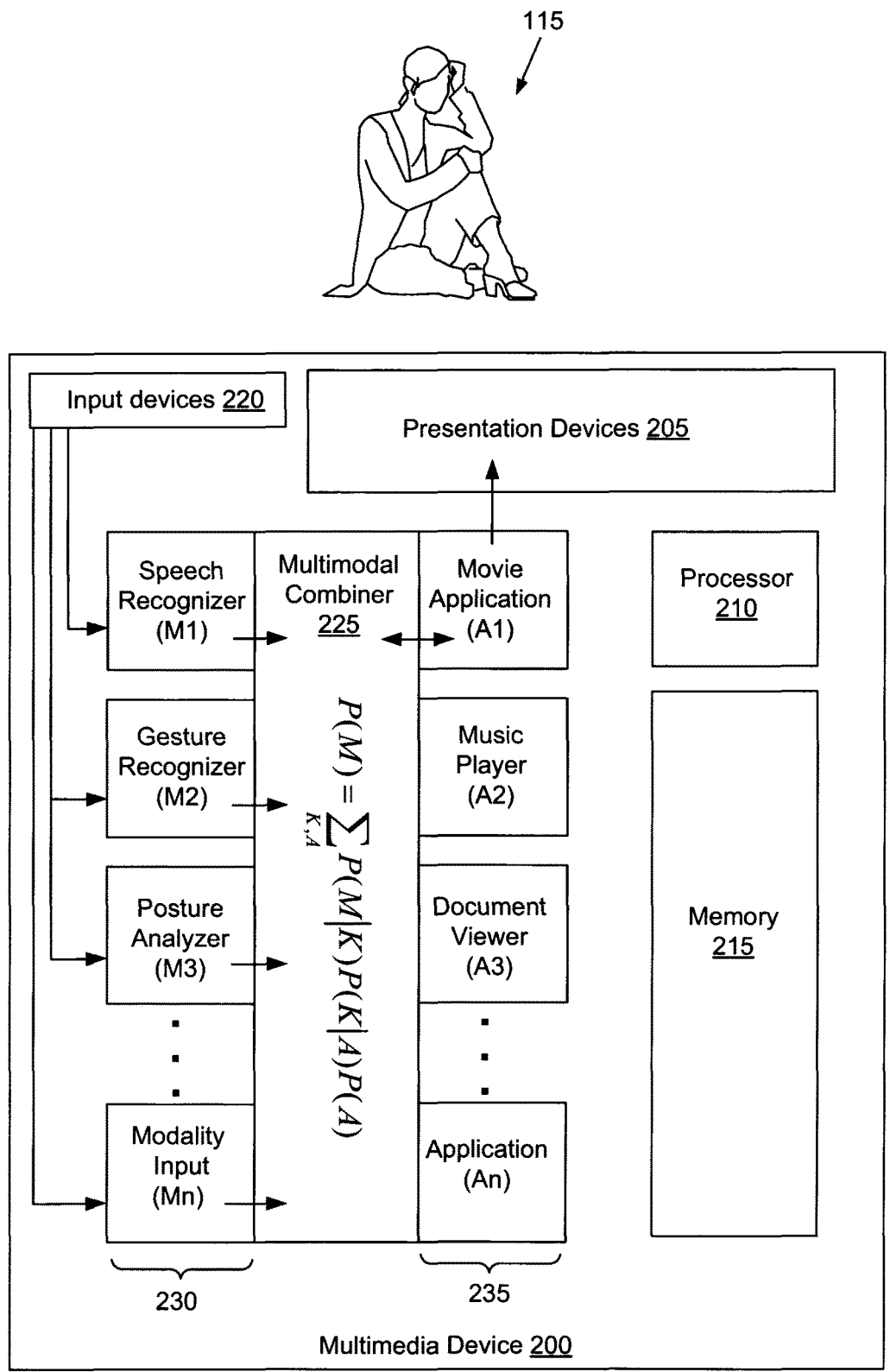
FIG. 4 is an illustrative system for adapting multimodal interactions based on body postures, according to one example of principles described herein.

FIG. 4 shows a participant 115 that is interacting with a multimedia device 200. The multimedia device 200 may include presentation devices 205 such as visual devices, audio devices, tactile devices, or other presentation devices. A number of input devices 220 receive input from the participant 115 or other participants in the group. The input devices 220 may include a color camera, a depth camera, a microphone, and accessory devices such as keyboards, joysticks, wireless controllers or other devices.

A number of recognition devices $M_1$ through $M_n$ receive input from one or more of the input devices 220. For example, a speech recognizer $M_1$ may receive input from a microphone. A gesture recognizer $M_2$ and a posture analyzer $M_3$ may receive combined input from a color and depth camera. A variety of other recognizers can also be used. The output of the recognizers 230 is input into the multimodal combiner 225.

The multimodal combiner 225 may also receive input from a number of applications $A_1$ through $A_n$. For example the applications 235 may include a movie application $A_1$, a music player $A_2$, a document viewer $A_3$, and other applications $A_n$. The multimode combiner 225 uses this input to more accurately recognize the control commands input by the participant 115. For example, the input devices 220 receive control input from the participant 115 who is watching a movie displayed on the presentation devices 205 by the movie application $A_1$. The posture analyzer $M_3$ recognizes that the current posture of the participant 115 does not permit hand gestures because both the participant's hands are immobilized. One hand is supporting the participant's head and the other hand is supporting participant's elbow.

Thus, when the multimodal combiner receives the input, it discards or otherwise devalues, input from gesture recognizer $M_2$. The multimodal combiner 225 may increase the importance or confidence in the input from the speech recognizer $M_1$ because the posture of the participant 115 indicates that she will rely on verbal rather than gestural commands.

In one implementation, the recognizers 230, applications 235, and combiner 225 are implemented on a computer processor 210 and memory 215 contained in the multimedia device 200. The memory 215 may store instructions, commands, application settings, user history, and other data. The data can be retrieved from the memory 215 to implement the functions of the multimedia device 200.

The multimodal combiner 225 may be implemented in a variety of ways and use a range of algorithms to combine the inputs from the applications 235 and recognizers 230. For example, a probability of a communication modality P(M) can be calculated according to the following formula:

$$P(M) = \sum_{K,A} P(M|K)P(K|A)P(A)$$

Where:
P(M|K) is the probability of a modality given a posture K;

P(K|A) is the probability of a posture given an application A; and

P(A) is the probability of an application for a multimedia device.

The term P(M|K) can be determined from participant study where it is determined which modality is more/less likely for a particular posture. The term P(K|A) can be determined using the output confidence value of the posture recognizer, P(K|O), where O is the observation from a camera, and from participant studies/heuristics on use of a posture for particular application. For example use of a movie viewing application may have higher probability of the lounging posture than a calendar application. The term P(A) can be determined again from participant studies where a particular device may determine the a-priori probability of an application. For example, document viewing application may have lower probability on a small mobile device than a larger screen device. Many other such heuristics can be additionally or alternatively be used. For example, when a group of participants interacts with the multimedia device, one participant may be assigned primary control of the interaction with other participants being assigned secondary roles. Certain types of control input would be preferentially accepted from the participant with primary control of the interaction.

Figure 5:
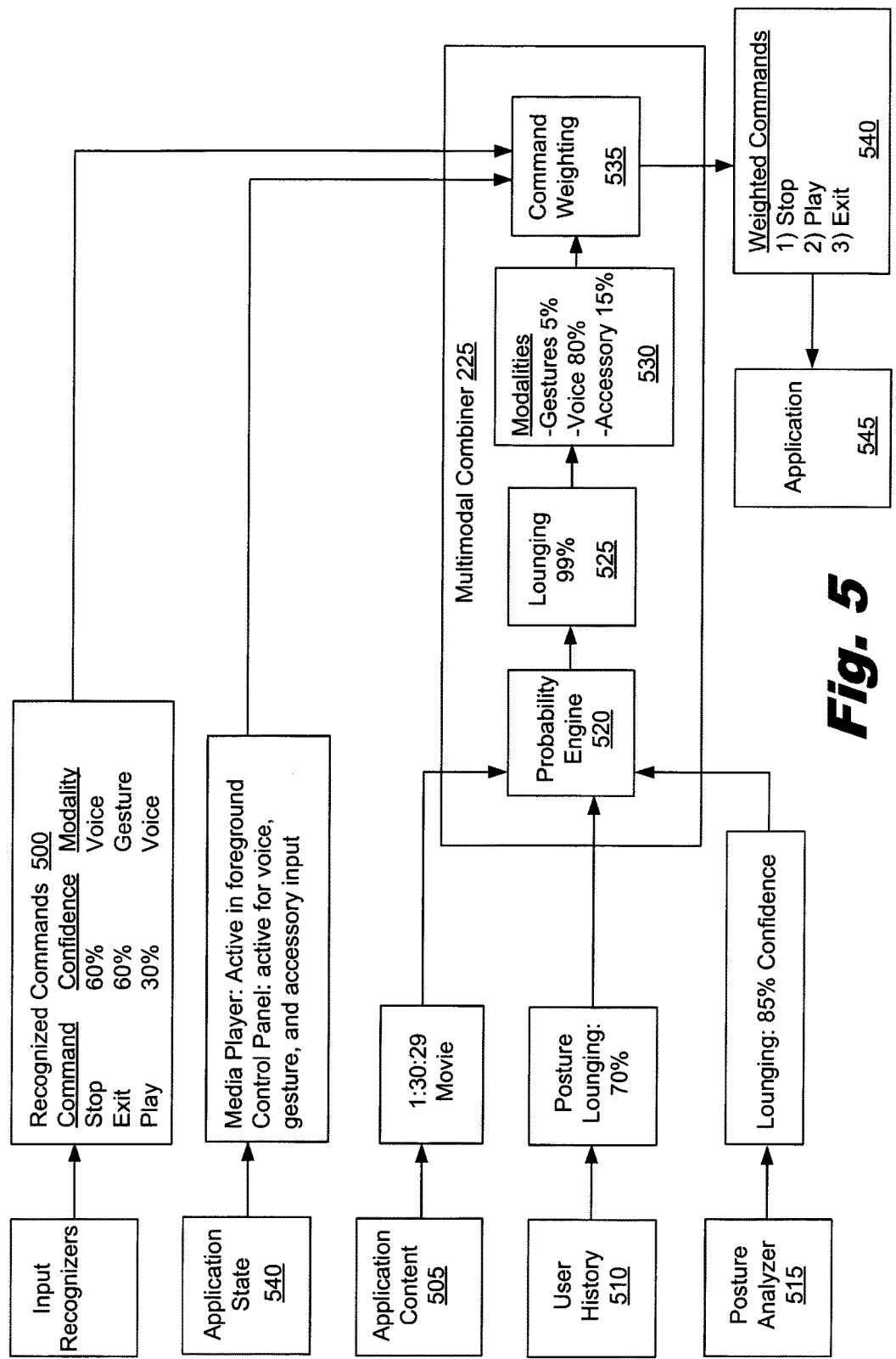
FIG. 5 shows data flow within a system for adapting multimodal interactions based on body postures, according to one example of principles described herein.

FIG. 5 shows one example of data flow through the multimedia system. In this example, a participant has been watching a movie displayed on by a media player. The participant is "rewinding" the media to more closely observe a portion of the movie. During the rewinding operation, the input recognizers continuously evaluate the participant and output a number of recognized commands 500. The recognized commands include: "stop" using a verbal modality and having a confidence level of 60%; "exit" using a gesture modality and having a confidence of 60%; and "play" using a verbal modality and having a confidence of 30%. Without the multimodal combiner 225, the multimedia system would be unable to accurately determine which command was actually communicated by the participant.

The multimodal combiner 225 accepts additional information in a variety of forms, including application content 505, which reports that a movie having a length of one hour and thirty minutes is being watched. The multimodal combiner 225 also receives a participant history 510 which reports that the participant has often assumed a lounging posture in the past when watching movies and consequently is likely to assume a lounging posture in the current situation. The posture analyzer 515 analyzes the participant's current posture and reports that the participant is lounging with a confidence level of 85%. All of these inputs are received by a probability engine 520 in the multimodal combiner 225. The probability engine 520 outputs posture data 525 that indicates that the participant is in a lounging posture with a confidence level of 99%. The multimodal combiner 225 translates this into an expected communication modalities 530, with voice communication being highly probable and gesture communication be much less likely.

Application state data 540 is supplied to the multimodal combiner 225. In this case, the application state data 540 includes which application is in the foreground, if the control panel is active, and which communication modalities the application can accept. The application state data 540 may also include a specific listing of available commands in the application state. The multimodal combiner 225 weights the recognized commands 500 by the expected communication modalities 530 and outputs a weighted list of prioritized commands 542 to the application 545. In this example, the multimodal combiner 225 determines that the "exit" command should have a lower priority than the other commands because it was received through a gesture modality. Thus, the prioritized command list output by the multimodal combiner 225 correctly prioritizes the verbal "stop" command as the most likely command. The prioritized command list 542 is sent to the application 545, which can apply rules and/or logic to select one of the commands. For example, the application 545 may simply use the highest ranked command on the list 540. Consequently, the application 545 stops the movie at the appropriate frame.

Figure 6:
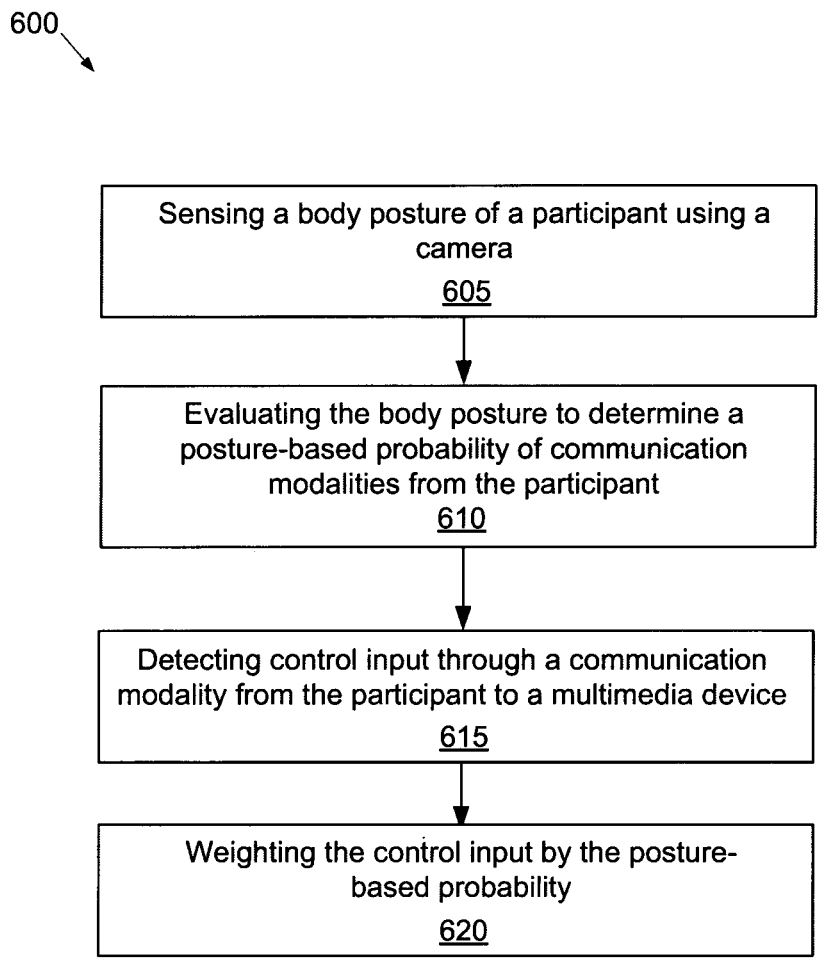
FIG. 6 is a flowchart of an illustrative method for adapting multimodal interactions based on body postures, according to one example of principles described herein.

FIG. 6 is a flow chart for a method of multimodal human-machine interaction that includes sensing a body posture of a participant using a camera (block 605) and evaluating the body posture to determine a posture-based probability of communication modalities from the participant (block 610). Control input is detected through a communication modality from the participant by a multimedia device (block 615). The control input is weighted by the posture-based probability (block 620).

Figure 7:
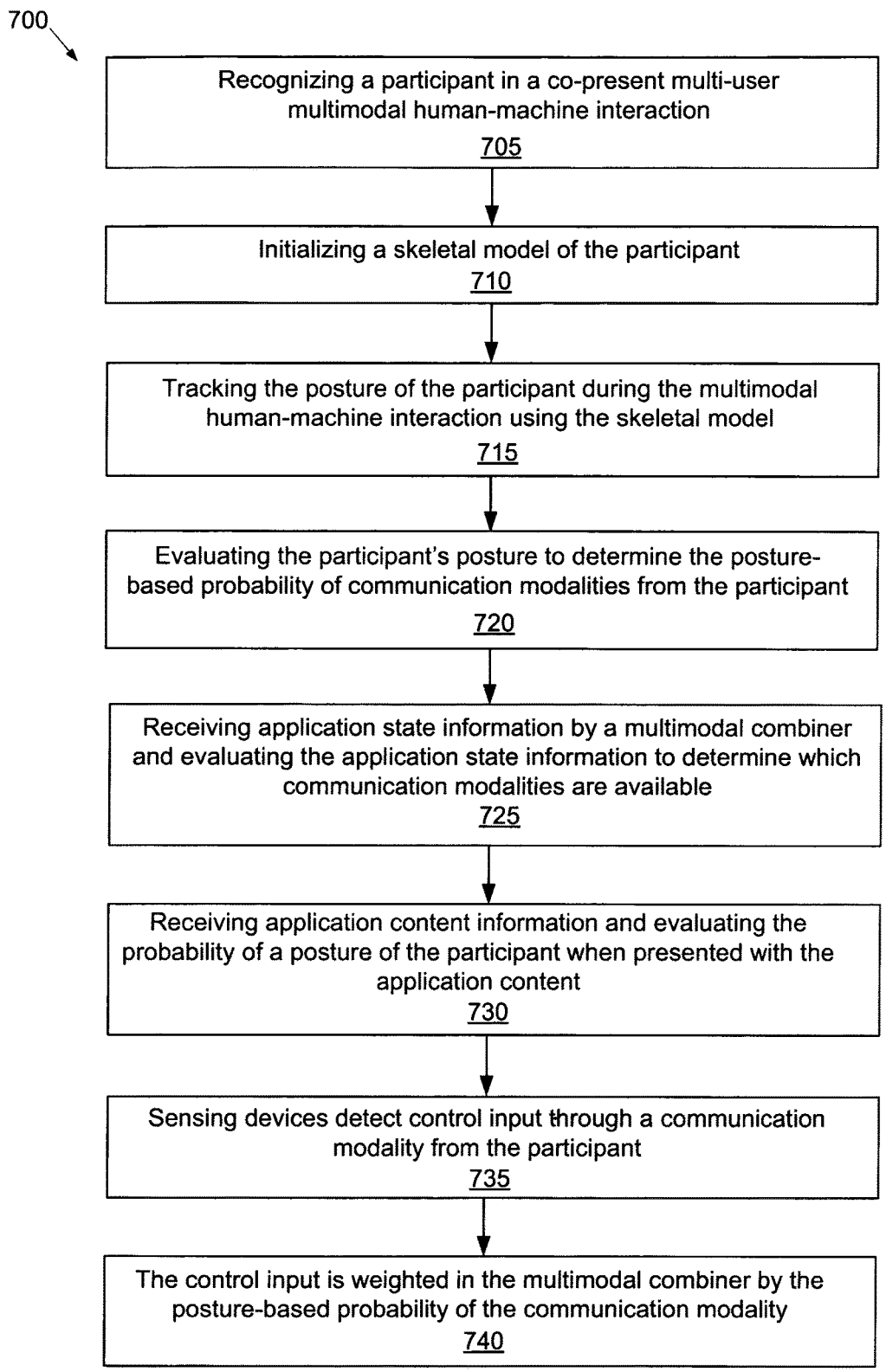
FIG. 7 is a flowchart of an illustrative method for adapting multimodal interactions based on body postures, according to one example of principles described herein.

The method described above is an illustrative example. A number of changes that could be made to the method including combining, adding, reordering or deleting blocks. For example, FIG. 7 is a flow chart 700 of a method for human-machine interaction that includes recognizing a participant in a co-present multi-user multimodal human-machine interaction (block 705). A skeletal model of the participant is initialized (block 710) and the posture of the participant is tracked during the multimodal human-machine interaction using the skeletal model (block 715). The participant's posture is evaluated to determine posture-based probability of communication modalities from the participant (block 720). A multimodal combiner receives application state information and evaluates application state information to determine which communication modalities are available (block 725). The multimodal combiner also receives application content information and evaluates the probability of a posture of the participant when presented with the application content (block 730). Sensing devices detect control input through a communication modality from the participant (block 735). The control input is weighted in the multimodal combiner by the posture-based probability of the communication modality (block 740).

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for multimodal human-machine interaction comprising:
    sensing a body posture of a participant using a camera;
    evaluating the body posture to determine a posture-based probability that certain modalities of communication will be presented by the participant based on the body posture, the posture-based probability being calculated using a processor in a multimedia device; wherein the modalities of communication comprise gestural and vocal;
    precluding, as input o the processor, a gestural modality of communication based on a determination that the calculated posture-based probability of the gestural modality of communication is below a predetermined level while receiving as input the vocal modality of communication;
    detecting control input presented via a modality of communication by the participant using a sensing device in the multimedia device;
    weighting the control input by the posture-based probability to determine a command to associate with the control input; and
    wherein calculating the posture-based probability of the gestural modality of communication is accomplished according to the following formula:

$$P(M) = \sum_{K,A} P(M|K)P(K|A)P(A)$$

where
    P(M) is the probability of a modality M;
    P(M|K) is the probability of a modality given a posture K;
    P(K|A) is the probability of a posture given an application A; and
    P(A) is the probability of an application for a multimedia device.

2. The method of claim 1, further comprising receiving application state information describing which modalities of communication each of a number of applications can accept.

3. The method of claim 2, further comprising evaluating the application state information to determine which commands associated with each of the applications are available.

4. The method of claim 1, further comprising:
    receiving application content information; and
    evaluating, with a posture recognizer and based on the application content information, a probability of a posture of the participant when presented with application content described in the application content information.

5. The method of claim 4, further comprising:
    receiving an output confidence of the probability of a posture of the participant from the posture recognizer; and
    weighting the probability of a posture of the participant by the output confidence.

6. The method of claim 1, further comprising:
    recognizing the participant;
    retrieving a record of past postures assumed by the participant during specific multimedia interactions; and
    weighting input control based on the past postures assumed by the participant during the specific multimedia interactions.

7. The method of claim 1, wherein weighting the control input by the posture-based probability further comprises generating a list of prioritized commands associated with the application, the most likely command associated with the control input included on the list.

8. The method of claim 1, wherein command list associated with each of the gestural and vocal modalities of communication are stored on a memory device associate with the processor.

9. A method for human-machine interaction implemented by a processor in a multimedia device comprising:
    recognizing a participant in a co-present multi-user multimodal human-machine interaction with a multimedia device;
    initializing a skeletal model of the participant;
    tracking a posture of the participant during the multimodal human-machine interaction using the skeletal model;

evaluating the participant's posture to determine a posture-based probability of communication modalities from the participant, the modalities of communication comprising vocal and gestural modalities of communication;

receiving application state information associated with an application and evaluating application state information to determine which communication modalities are available;

receiving application content information and evaluating a probability of a posture of a participant when presented with the application content;

detecting control input through a communication modality from the participant;

precluding, as control input, gestural modalities of commutation when the probability of receiving gestural modalities of communication falls below a threshold level while permitting, as control input, vocal modalities of communication; and weighting the control input by the posture-based probability;

wherein weighting the control input by the posture-based probability further comprises weighting the control input based on past postures assumed by the participant when presented with the application content; and wherein determining the posture-based probability of communication modalities is accomplished via the following formula:

$$P(M) = \sum_{K,A} P(M|K)P(K|A)P(A)$$

where
P(M) is the probability of a modality M;
P(M|K) is the probability of a modality given a posture K;
P(K|A) is the probability of a posture given an application A; and
P(A) is the probability of an application for a multimedia device.

10. The method of claim 9, wherein recognizing a participant in a co-present multi-user multimodal human-machine interaction with a multimedia device further comprises recognizing a gaze of the participant and reducing the probability that the participant is implementing any commands via any communication modalities.

11. The method of claim 9, wherein weighting the control input by the posture-based probability further comprises generating a list of prioritized commands associated with the application.

12. A multimedia device comprising:
a sensing device;
an application for presenting a multimedia experience to a participant;
a recognition module for accepting input from the participant through the sensing device;
a posture analyzer for outputting a participant posture; and
a multimodal combiner for evaluating a probability of a communication modality given the participant posture and for weighting input from the participant by the probability of a communication modality;
wherein the communication modality comprises vocal and gestural communications; and
wherein the multimodal combiner precludes, as input, gestural commutation modalities when the probability of receiving gestural communication modalities has indicated that gestural communication modalities are not valid communication modalities; the preclusion of gestural communication modalities occurring while permitting, as input, vocal communication modalities;
wherein evaluating the probability of the communication modality is accomplished by determining the output of the following formula:

$$P(M) = \sum_{K,A} P(M|K)P(K|A)P(A)$$

where
P(M) is the probability of a modality M;
P(M|K) is the probability of a modality given a posture K;
P(K|A) is the probability of a posture given an application A; and
P(A) is the probability of an application for the multimedia device.

13. The device of claim 12, in which the sensing device comprises a color camera and a depth camera.

14. The device of claim 12, further comprising application state information and application content information passed from the application to the multimodal combiner.

15. The device of claim 14, in which the application content information comprises identification of a type of media being displayed and the length of the media presentation.

16. The device of claim 15, further comprising a probability of a posture calculated from a confidence level of the posture analyzer and application content information.

17. The device of claim 14, in which the application state information comprises identification of which application is currently in the observable foreground of the multimedia device and which commands are currently active in the application.

18. The device of claim 12, in which the recognizer module comprises a speech recognizer and a gesture recognizer, the multimodal combiner for weighting input from the speech recognizer and gesture recognizer by the probability of a communication modality derived from the participant posture.

* * * * *

UNITED STATES PATENT AND TRADEMARK OFFICE
CERTIFICATE OF CORRECTION

PATENT NO. : 9,619,018 B2  
APPLICATION NO. : 14/119865  
DATED : April 11, 2017  
INVENTOR(S) : Ramadevi Vennelakanti et al.

Page 1 of 1

It is certified that error appears in the above-identified patent and that said Letters Patent is hereby corrected as shown below:

In the Claims

In Column 7, Line 62, in Claim 1, delete "o" and insert -- to --, therefor.

In Column 8, Line 55, in Claim 8, delete "wherein command" and insert -- wherein a command --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*